United States Patent [19]

Schrader

[11] 3,761,684

[45] Sept. 25, 1973

[54] SPROCKET SIGNAL PROCESSOR

[75] Inventor: William A. Schrader, Mission Viejo, Calif.

[73] Assignee: Ex-Cell-O Corporation, Detroit, Mich.

[22] Filed: Apr. 12, 1972

[21] Appl. No.: 243,153

[52] U.S. Cl. .......... 235/61.11 R

[51] Int. Cl. .......... G06k 7/016

[58] Field of Search .......... 235/61.11 R, 61.11 D, 235/61.11 E; 250/219; 340/174.1; 178/17

[56] References Cited

UNITED STATES PATENTS

| | | | |
|---|---|---|---|
| 3,305,670 | 2/1967 | Thomas | 235/61.11 R |
| 3,544,979 | 12/1970 | McDonald, Jr. et al. | 340/174.1 |
| 3,705,416 | 12/1972 | Head | 235/61.11 E |
| 3,710,078 | 1/1973 | Lemelson | 235/61.11 E |

*Primary Examiner*—Daryl W. Cook
*Attorney*—Edward J. DaRin et al.

[57] ABSTRACT

The sprocket signal processor is adapted for record member readers wherein the record member is subject to oscillations or jitter due to its advancement over a sensor. To prevent the recognition of erroneous signals and in particular sprocket hole signals reduced on the record member with the data for controlling the read out of the data, the sprocket signal is processed so as to block out erroneous signals and to provide only the desired sprocket hole signal for read out purposes, thereby preventing erroneous read out of the record member.

7 Claims, 4 Drawing Figures

SPROCKET SIGNAL PROCESSOR

DISCLOSURE OF THE INVENTION

This invention relates to apparatus for reading a record member subject to oscillation or jitter as it is advanced over a sensor and more particularly to apparatus for processing the sensed signals to prevent the occurrence of erroneous output signals.

This invention is related to and may employ the inventions disclosed in the copending patent application bearing Ser. No. 45,172 entitled STEPPING MOTOR DAMPING SYSTEM and now U.S. Pat. No. 3,660,746 and assigned to the same assignee as this application. The present invention may be integrated into the type of control circuit for the stepping motor of the type disclosed and claimed in said copending application including the motor damping circuits for the stepping motor.

Record members take on many forms in the prior art. One form of record member is commonly known as "paper" tape, although various materials other than paper are employed. Paper tape is conventionally utilized to record information in some binary coded format. Other familiar forms of record members such as punch cards and the like are also similarly employed to record information in a binary format. When a paper tape is employed as the record member, the information or data is recorded on the paper tape in the binary format in the form of punched holes arranged in rows and columns. Associated with each piece of information, which may be a line of information arranged in a row, is a control mark or control punch that is individual to each line. The control mark or information recorded on the record member has been conventionally referred to as a sprocket or feed hole in view of the manner in which the record member is advanced. A paper tape format of this type is illustrated in FIG. 1 of U. S. Pat. No. 3,549,867. Specifically, the record member may be advanced by means of a driven sprocket wheel which engages the sprocket or feed holes in the paper tape and advances it in unison with the advancement of the wheel. The punched paper tape is usually advanced over some photoelectric system for sensing the recorded information on the record member. The electrical information derived from the sensor then is the electrical representation of information recorded on the record member in terms of punched holes, marks or the like as the record member is exposed to the sensor. The record member is usually advanced over the sensor by means of tape guides which are mounted on opposite sides of the record member so that it may be positively advanced and guided over the sensor to provide registration of the punched holes relative to the sensor. The record member may be advanced over the sensor in increments or on a step-by-step basis to allow the information to be derived from the record member in a corresponding sequential relationship.

When the record member is incrementally advanced, it is rapidly accelerated from an at rest position to a running position and then back to the at rest position, causing the tape to tend to buckle or float within the tape guides in a transverse direction. This undesirable action of the tape within the guides effectively moves a line of information back and forth over the sensor so as to produce multiple sprocket or control information transitions even though the tape has only been advanced one line by the advancing means or motor. This undesirable tape motion has been found to be especially prevalent when stepping motors are utilized for incrementally advancing a record member by means of sprocket wheels due to the tendency of the stepping motor to hunt about their selected positions as they lock into position. Circuits have been developed to minimize the amount of oscillation or hunting produced by the stepping motor as it is stepped from position to position. These circuits, however, do not eliminate the erroneous transitions of the tape over the sensors. These erroneous transitions of the record member, however, produce sprocket signals or control signals that are intolerable in most types of data processing systems. These multiple transitions of the same piece of data over the sensor causes the equipment to interpret the multiple transitions of the same information as multiple lines of information whereby a single line of information would be acted on a corresponding multiplicity of times resulting in gross errors. This is true since the sprocket hole provides the control signal that controls the read out of the data recorded in alignment with the sprocket hole on the tape. Accordingly, there is a need for apparatus that may advance a record member incrementally at a high speed without the introduction of erroneous sprocket signals and the like into the data processing equipment to avoid gross errors in the data processing operations.

The present invention provides an improved sprocket signal processing circuit for record member readers that are advanced incrementally at high speeds which removes any erroneous, multiple signal transitions derived from the tape sensor or reader. The sprocket signal processor of the present invention is constructed and defined to allow only one set of negative and positive signal transitions for each advance command to the record member advancing means or stepping motor. The circuits of the present invention insure that only the desired set of transitions representative of the recorded sprocket or control information is coupled to the associated data processing equipment and any erroneous undesirable transitions due to the jitter or oscillations produced in the tape motion are blocked out.

From a structural standpoint, the present invention comprehends control apparatus for advancing the record member having the control information recorded thereon that includes stepping motor means adapted to be coupled to a record member for linearly advancing a member in preselected increments. The motor may include a stator having individually energizable windings and a rotor magnetically coupled to the stator and responsive to the energization of the individual windings for rotating the rotor in said preselected increments. The apparatus further includes means for sensing the recorded control information on the record member and providing electrical signals corresponding to each sensed piece of control information. Binary signal generating means is coupled to be responsive to the signals from the sensing means and provide corresponding binary control signals in response thereto. The binary control signals are applied to binary counting means for providing output signals that are coupled to the individual windings of the motor stator in accordance with each count of the counter. The control apparatus further includes triggerable circuit means coupled to be responsive to the binary signal generating means for providing an output signal of a preselected time duration related to the time required to incrementally advance the record member from position to position or line to line. The output signal from the triggerable circuit means is coupled to the binary signal generating means for maintaining it in a preselected state for a preselected time duration dependent on the acceleration characteristics of the reader so as to time out between feed or sprocket holes. The binary signal generating means may include a pair of binary signal storage elements coupled to be responsive to the control signal or sprocket signal derived from the record member and to the output signal from the triggerable circuit means for providing output signals for controlling the rate of said binary signal generating means. Further circuit means are provided that are coupled to be responsive to the output signals from the binary signal storage element for defining a single control signal representative of the control information recorded on the record member for each incremental advancement of the record member without any undesired signals.

These and other features of the present invention may be more fully appreciated when considered in the light of the following specification and drawings, in which.

Figure 1:
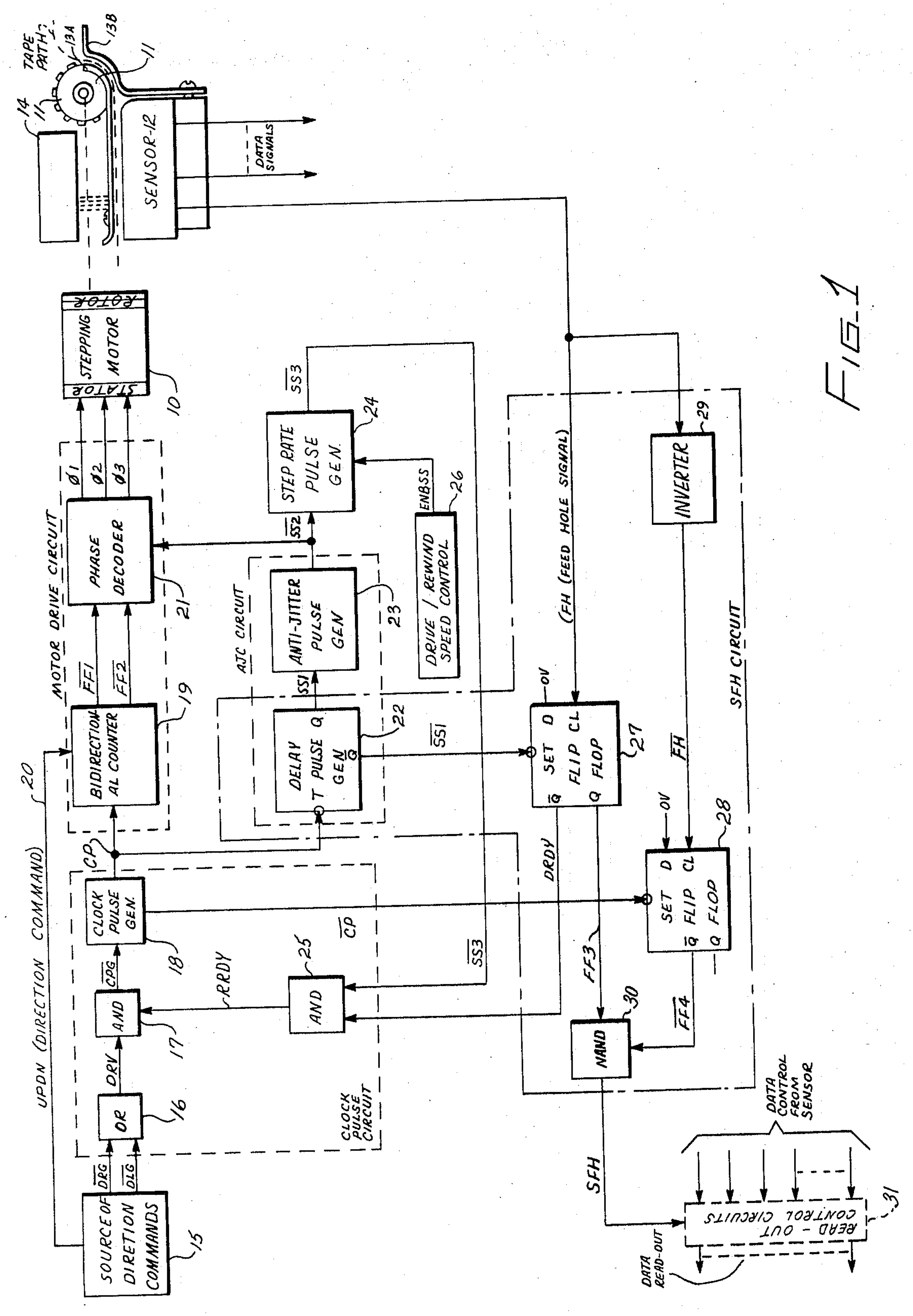
FIG. 1 is a block diagram of the control system for reading a record member and embodying the present invention.

Now referring to the drawings and with particular reference to FIG. 1, the control system for implementing the present invention will be examined. The control system as illustrated in FIG. 1 is adapted for controlling a stepping motor 10 of the type described in the aforementioned copending patent application bearing Ser. No. 45,172. It should be understood that the detailed circuits for controlling the stepping motor 10 including the system for damping the motor are reflected by the block diagram of the system illustrated in FIG. 1. Although portions of this system will be described, the detailed description of the control arrangement can be further appreciated from the disclosure in said copending application Ser. No. 45,172 and which disclosure is incorporated hereby by reference.

Specifically, the stepping motor 10 is illustrated as coupled to a sprocket wheel 11 for engaging in a driving relationship the record member or paper tape (not illustrated). The path of the record member as it approaches the sprocket wheel 11 and travels past the sensor 12 is illustrated by dotted lines. The paper tape path is defined between an upper tape guide 13A and a lower tape guide 13B when the tape is advanced therethrough as a result of being coupled to the teeth of the sprocket wheel 11 at the sprocket hole or feed hole normally provided therefor. It should be appreciated that at each incremental rotation of the sprocket wheel 11 that the paper tape is advanced through the guides 13A and 13B for positioning a new piece or line of information over the sensor 12. The sensor 12 may be any conventionally available phtovoltaic device for providing an output signal corresponding to each piece of information recorded on the tape. In terms of conventional paper tape apparatus the sensor provides a group of signals corresponding to each line of binary coded bits recorded on the tape and provides this information on a line by line basis as the tape is incrementally advanced over the sensor. The light source assembly utilized with the sensor 12 is illustrated as a block 14 which illuminates the paper tape for this purpose, as is well known. The portions of the sensor 12 exposed to the light will produce a corresponding electrical output indication in response thereto. Accordingly, the pattern of perforations or marks on the record member in a particular line are produced at the sensor 12 as a corresponding pattern of electrical signals.

The control circuit for the stepping motor 10 is of the type described in the aforementioned copending patent application. The control circuit comprises a source of direction commands illustrated in block form and identified by the reference No. 15. The signals from the source of direction command 15 are provided for driving the rotor of the stepping motor 10 in either a clockwise or counterclockwise direction in accordance with the desired direction of advancement of the record member over the sensor 12. These signals are identified as the $\overline{DRG}$ signals for the drive right command and $\overline{DLG}$ for the drive left command. This pair of signals are coupled to an OR gate 16 for providing the output signals identified as the signal DRV for the drive command which is applied to one input of the AND gate 17. The output signal from the AND gate 17 provides the necessary triggering signal to the clock pulse generator 18. This triggering signal from the AND gate 17 is identified as the $\overline{CPG}$ signal. The clock pulse generator generates clock pulses at a preselected rate and which clock pulses are identified as the CP pulses in the system. The clock pulses are received by a bidirectional counter 19. The bidirectional counter 19 is also coupled to be responsive to a direction command signal from the source of direction commands 15 appearing on the lead wire 20. The direction command signal appearing on the lead wire 20 may be considered an up-down control signal which controls the direction of count of the bidirectional counter 19 in accordance with the desired direction commanded for advancing the record member. The bidirectional counter 19 provides a pair of signals therefrom that are identified as the $\overline{FF1}$ and $\overline{FF2}$ signals for providing the necessary output signals to energize the windings for the stepping motor 10. For this purpose the bidirectional counter 19 has three distinct states for defining the three phases for energizing the stepping motor 10. The resulting voltage output patterns from the counter 19 for these three states are decoded by a phase decoder 21 for providing the necessary energization of the motor windings. The windings are identified in the block diagram as the lead wires for the individual $\phi$ 1, $\phi$ 2 and $\phi$ 3 windings coupled to the motor 10. With the sequential energization of the phase windings of the motor, the motor will be incremented in response thereto.

The clock pulses from the clock pulse generator 18 are also applied to a delay pulse generator 22 which is a portion of an anti-jitter control circuit of the type disclosed in the aforementioned application. The generator 22 may be a 2 milli-seconds one-shot multivibrator.

The output signal from the delay pulse generator 22 that is derived from the Q output thereof is identified as the SS1 signal and is applied to the anti-jitter pulse generator 23 comprising the other element of the anti-jitter control circuit. The anti-jitter pulse generator 23 may be further defined as a one-shot multivibrator having a time delay of 0.4 – 0.9 miliseconds in one practical embodiment. The anti-jitter control circuit may be of the same type described in the aforementioned patent application for providing the necessary damping action on the motor rotor as it is incremented from position to position to prevent overshooting. The output signal from the anti-jitter pulse generator 23 is identified as the $\overline{SS2}$ and is coupled to the phase decoder 21 and a step rate pulse generator 24 adapted for adjusting the speed of the motor 10. The step rate pulse generator 24 may be a further one-shot multivibrator and provides the output signal identified as the $\overline{SS3}$ having a time interval on the order of 4.4 milliseconds. This $\overline{SS3}$ output signal is applied as one input signal to the AND circuit 25 having its output circuit coupled to the AND gate 17. The output signal from the AND gate 25 is identified as the RRDY signal. The step rate pulse generator 24 is also coupled to be responsive to the drive/-rewind speed control signal identified as the block 26. The output signal from the block 26 is coupled to the pulse generator 24 and is identified as the ENBSS signal.

The electrical signal corresponding to the sprocket hole or the feed hole that is derived from the sensor 12 is identified as the FH signal and is coupled to a clock (CL) input of a bistable storage element 27. The bistable storage element 27 is the type of bistable storage element of flip-flop that is termed in the art as a positive edge triggered type D device. In this type of bistable element the input information, whether at a high or a low voltage level, that is coupled to the D input is transferred to the Q output terminal thereof at the time of a positive transition of the clock signal. In this instance, the clock input is coupled to the feed hole signal FH. As arranged in the block diagram of FIG. 1, the bistable element 27 is responsive to the positive transitions of the feed hole signal. This, of course, corresponds to the leading edge of the sprocket hole sensed on the tape. The bistable element 27 also includes a "set" input terminal which receives the $\overline{SS1}$ signal from the $\overline{Q}$ output of the delay pulse generator 22. The output signal from the bistable element 27 derived from the Q output thereof is identified as the FF3 signal and is coupled as one input to the NAND gate 30. The $\overline{Q}$ output signal from the bistable element 27 is identified as the DRDY signal and is coupled to the remaining input of the AND gate 25. The AND gate 25 forms a portion of the clock pulse circuit and is utilized to control the clock pulse generator 18.

The feed hole (FH) signal from the sensor 12 is also applied to a second bistable storage element 28 by means of an inverter 29. The $\overline{FH}$ signal derived from the inverter 29 is applied to the clock input of the bistable storage element 28. The bistable storage element 28 is of the same type as the element 27. The bistable element 28, however, is adapted to be responsive to the negative transitions of the feed hole signal or the trailing edge of the sprocket hole on the record member. As in the bistable element 27, the D terminal is coupled to a zero voltage level. The set input for the element 28 is coupled to the clock pulse generator 18 to receive the complement of the clock pulse signal, the $\overline{CP}$ signal. The $\overline{Q}$ output signal of the bistable storage element 28 provides a signal identified as the $\overline{FF4}$ signal and is coupled to the remaining input terminal of the NAND gate 30. The output signal of the NAND circuit 30 is identified as the SFH signal. The SFH signal is denominated as a synthetic feedhole signal. In accordance with the present invention, the synthetic feed hole corresponds identically to the sprocket hole on the record member and is considered free of any spurious signals that may be generated as the result of undesirable transitions of the tape over the sensor 12. In conventional read out systems for a paper tape record member, a feed hole is generally employed to control the reading out, or gating out, of the data signals recorded therewith. Specifically, the sprocket hole signal is used to gate out a line of information. Accordingly, to prevent the multiplicity of gating or reading out of the same piece of information, the SFH signal is employed to control the read out of the data signals from the same line on the record member as the feed hole thereby eliminating from the read out data erroneous data produced at the sensor 12. This assures that the data read out of the read out control circuits 30 represent only the information recorded on the record member without multiple reading out of the same line of information due to the transitions of the tape over the sensor.

Figure 2:
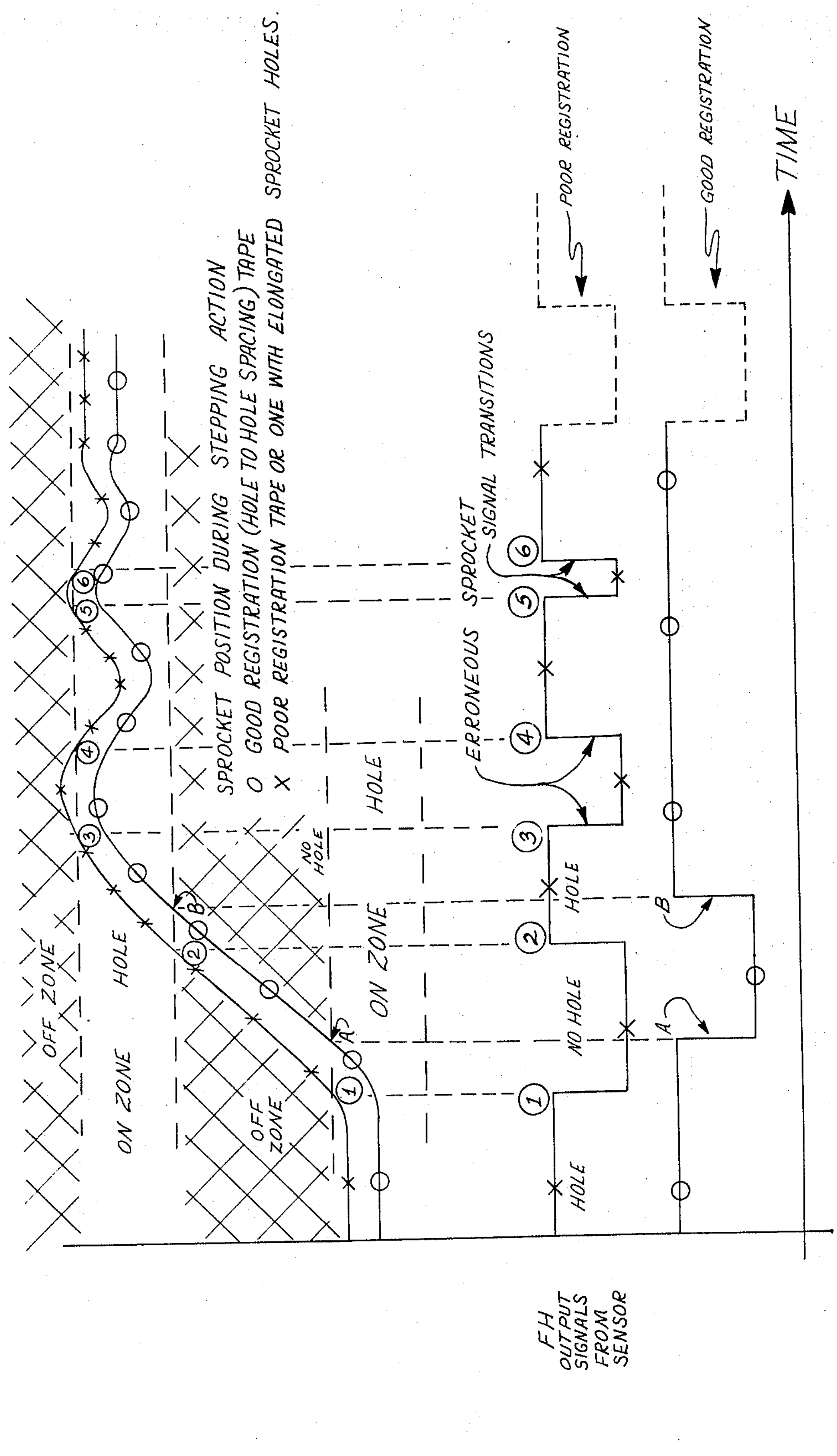
FIG. 2 is a graphical illustration of the relationship between the feed hole signals and the registration of the feed holes with respect to the sensor illustrating the manner in which erroneous sprocket signal transitions may occur.

To better appreciate the present invention, the manner in which erroneous sprocket signals may be generated as a result of the transitions of the paper tape over the sensr 12 will be examined. This relationship is clearly illustrated in FIG. 2 in terms of a paper tape 12 that is in good registration and poor registration with respect to the sensors. Specifically, the registration refers to the hole-to-hole spacing of the tape relative to the sensor and poor registration may result from either poor spacing or elongated sprocket holes. As illustrated in FIG. 2, two types of registrations of the tape are illustrated with respect to the zones on the tape that define the feed hole areas and the "no hole" areas. The zones are identified in FIG. 2 as the ON zones and the OFF zones. The OFF zones correspond to an area on the tape in which there is no hole, while the ON zone represents the area covered by a hole on the tape or the sprocket hole. A signal is generated as the result of the transitions of the tape from one zone to the other. In the graphical illustration of the tape having good registration, the hole spacing produces the desired signals in the lower waveform or the desired FH signal. The transitions from the ON zone to the OFF zone are identified on the graph by the letter A and the corresponding transition of the feed hole signal is also identified as A. This signals the movement of the tape from the trailing edge of the feed hole into the area between holes. Accordingly, the feed hole signal will drop to a low level for the time interval corresponding to the time interval required for the tape to travel through the OFF zone. As the tape travels from the OFF zone to the ON zone at the point identified as B, a tape transition occurs and the signal transition is also identified in the graphical illustration by the letter B. As the tape travels into the ON zone it will be seen that as a result of the good registration of the tape and despite any jitter or oscillation coupled to the tape that the tape remains within the ON zone and no erroneous sprocket signals are generated. This is to be contrasted with the other graphical representation of the tape path through the various zones when the tape has poor registration. The transitions into the zones for this graphical characteristic are identified by the numbers 1, 2, 3, 4, 5 and 6. The corresponding signal transitions are identified on the graphical illustration of the feed hole signals by the same numbers to define the erroneous sprocket signal transitions which would cause the multiple generation of sprocket hole signals unless the circuits of the present invention are employed. It should be evident that the erroneous sprocket signals are generated as a result of the tape making the transitions from the ON zone to the OFF zone and back from the OFF zone to the ON zone as clearly illustrated in FIG. 2.

Figure 3:
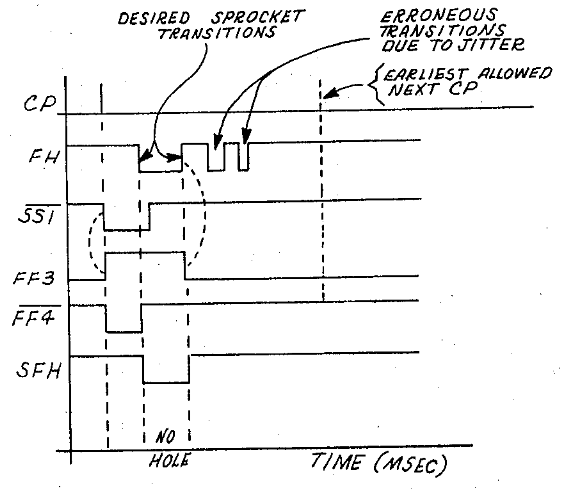
FIG. 3 is a graphical illustration of the waveforms of the signals that are unique to the control elements for blocking out the erroneous signals due to any undesired transitions of the record member.

With the above structure in mind, the operation of the circuits of the present invention will now be described. To simplify the consideration of the invention, the portion of the circuit responsible for blocking out the erroneous feed hole signals that are generated from the sensor 12 will be first examined. As described hereinabove, the feed hole signal (FH) from the sensor 12 is applied to the clock input of the bistable circuit 27 and the inverted version ($\overline{FH}$) is applied to the clock input of the bistable element 28. The operation of these particular circuits can be best appreciated in conjunction with the graphical illustration of the waveforms for the bistable elements 27 and 28 along with the output signals from the delay pulse generator 22 illustrated in FIG. 3. If it is assumed that a clock pulse is generated from the generator 18 and applied to the motor drive circuit for advancing the motor 10 and thereby the tape, the same clock pulse will be applied to the triggering input of the delay pulse generator 22. This clock pulse will be effective for providing the output signal $\overline{SS1}$ from the $\overline{Q}$ terminal of element 22. The signal $\overline{SS1}$ will set the bistable storage element 27 to a high voltage state as illustrated in FIG. 3 and continue to force that condition of the element 27 for the time duration of the delay pulse generator 22. The time interval is selected depending upon the acceleration characteristics of the reader and adjusted so that it times out during the OFF character, or OFF zones, between the holes on the tape. This assures that any jitter that occurs in the tape as it is advanced will not cause the feed hole to be falsely detected before it is possible for it to occur. With the timing out of the pulse generator 22, the bistable element 27 will be able to be clocked to the zero voltage state by a positive transition of the FH signal. Prior to that time, however, the clock pulse that had been generated is also provided the clock pulse signal $\overline{CP}$, or the complement thereof. The complement of the clock pulse signal $\overline{CP}$ is coupled to the set input of the bistable element 28. This forces the Q output to a high level state and the $\overline{Q}$ output is set to a low voltage state as appreciated from FIG. 3. These conditions will be maintained until the feed hole signal goes negative or the trailing edge of the feed hole is detected due to the advancement of the tape. This negative transition of the feed hole signal will clock a "high" voltage signal into the $\overline{Q}$ output of the bistable storage element 28 and the signal $\overline{FF4}$ will become a high level signal. Under these conditions, then, both the output signals from the bistable elements 27 and 28 are in a high voltage state resulting in a low level output from the NAND gate 28 and the SFH signal is at a low voltage level. When the SFH signal is in this low level condition, it signals that the reader is now between characters or holes as is desired.

The next event in the sequence is the timing out of the delay pulse generator 22 to cause the signal $\overline{SS1}$ to be set to a high voltage level. This transition of the signal $\overline{SS1}$ will allow the bistable storage element 27 to be clocked to the zero voltage state as the leading edge of the next successive sprocket hole on the record member is detected by the sensor 12. This will cause the output of the NAND gate 28 to assume a high voltage level indicating that the reader has advanced to the next character; see FIG. 3. With both of the elements 27 and 28 in the high voltage level states, no new transitions can occur in the SFH signal until another reader advance pulse restarts the sequence. Any erroneous transitions, such as illustrated in FIG. 2, that cause erroneous feed hole signals as the reader is advanced will be ignored by the SFH circuit comprising the elements 27 through 30.

Figure 4:
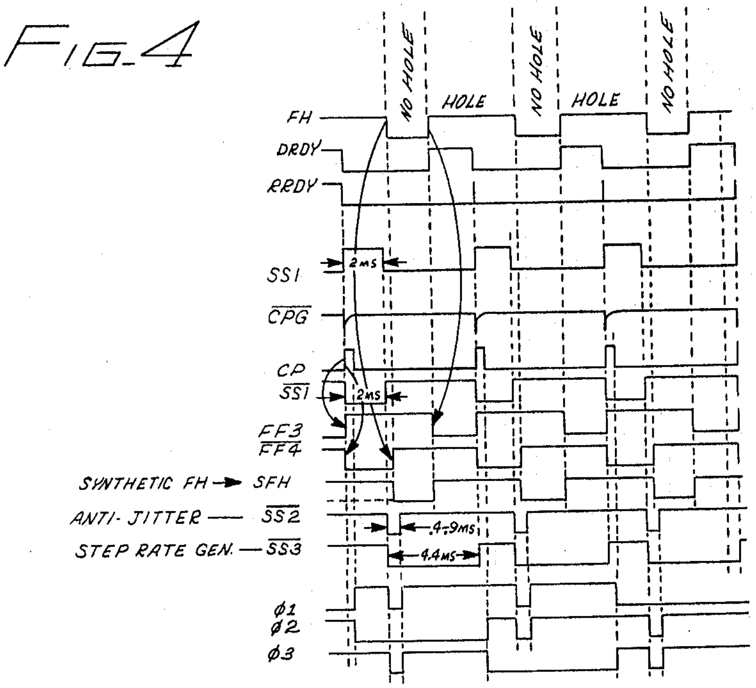
FIG. 4 is a graphical illustration of the signals appearing in various portions of the system of FIG. 1.

With the above circuit operation in mind, the overall system operation for controlling the stepping motor 10 and advancing the record member can now be considered. The specific operation of the control circuit for the stepping motor including the motor drive circuits and the anti-jitter control circuits are essentially as described in the aforementioned copending application bearing Ser. No. 45,172 and reference may be had to that specification for a detailed operation thereof. The present control circuit is of the same general type as discussed in said application except that the clock pulse generating circuit of the present invention is of slightly different construction for affording more positive control of the stepping motor. For this purpose it will be noted that the control of the clock pulse generator results from the signal from the two AND gates 17 and 25. The AND gate 25 is coupled to be responsive to the output signal from the step rate pulse generator 24 providing the $\overline{SS3}$ signal. It should be noted that the step rate pulse generator 24 depends upon the timing out of the one-shot multivibrators which comprise the elements 22, 23 and 24. This signal is logically combined at the AND gate 25 with the $\overline{Q}$ output signal from the bistable storage element 27. When these two signals are in coincidence at the AND gate 25 they produce the output signal RRDY. With the application of the drive signal and the RRDY signal to the AND gate 17, the clock pulse generator is triggered. The clock pulse generator 18 then will couple a clock pulse to be counted to the bidirectional counter 19 as well as to the set input of the bistable storage element 28. The motor drive circuit will function as described in the aforementioned copending application in response to the clock pulses applied to the counter 19 for energizing the windings of the stator of the stepping motor 10. The clock pulse is also applied to the delay pulse generator 22 and thereby to the anti-jitter pulse generator 23. The latter signal is coupled to the phase decoder 21 for providing the necessary energization of the stator windings of the stepping motor 10 to minimize the effect of any jitter of the rotor as it approaches its desired position. The waveforms of these output signals may be best appreciated by reference to FIG. 4. FIG. 4 also includes the waveforms of the elements of the SFH circuit for clarifying the over-all appreciation.

It should now be appreciated that with the advancement of the record member on an incremental basis over the sensor 12 and the provision of the electrical signals from the sensor representative of a line of information or the data signals from the sensor in combination with the sprocket hole signal that despite any jitter of the tape produced for any reason, that the output from the readout control circuits 31 will only provide a single read out of the data corresponding to a single line of the data on the record member due to the readout provided only by the SFH signal. The SFH signal can then be considered as a clean feed hole signal for this purpose. This, then, will prevent the erroneous readout of a multiplicity of data signals corresponding to the same line of information on the record member.

What is claimed is:

1. Apparatus for reading a record member subject to oscillations as a result of being rapidly advanced comprising means for sensing the data and the control information recorded on a record member as the record member is advanced thereover and provide electrical signals corresponding to the advancement of the recorded data and control information thereover, means for incrementally advancing a record member having data and control information recorded thereon to be sensed by the sensing means, circuit means coupled to be responsive to the control information signal from the sensing means for providing an output signal representative of the sensed control information, said circuit means providing a further signal representative of the sensing of the control information, and control circuit means coupled to be responsive to said further signal from said circuit means for providing advancing control signals to said advancing means in response to each of said further signals, said first-mentioned circuit means being adapted to provide only a single further signal in response to the sensed control information for a preselected time interval related to the rate of advancement of the control information on the record member to thereby block out any signals provided from the sensing means due to erroneous transitions of the record member thereover.

2. Apparatus for reading a record member subject to oscillations or jitter as it is conveyed over a sensor, said apparatus including means for incrementally advancing a record member having data and control information recorded thereon for each piece of data, means for sensing the data and the control information as the record member advances thereover and providing electrical signals corresponding to the data and the associated control information, binary signal generating means coupled to be responsive to the control signals derived from the record member and providing binary signals representative of the presence and absence of the recorded control information, signal generating means coupled to be responsive to the binary signal generating means for providing signals for energizing said advancing means, means coupled to be responsive to the signal generating means for maintaining said binary signal generating means in a preselected binary state for a predetermined time interval related to the rate of advancement of the record member and the spacing of the recorded control information to prevent the generation of erroneous signals due to successive transitions of the same control information over the sensing means, and means coupled to be responsive to the binary signal generating means for producing a signal representative of the correct recorded control information despite any undesired transitions of the record member and the multiple sensing of the same recorded information.

3. Apparatus for reading a record member as defined in claim 2 wherein said means for maintaining the binary state of the signal generating means is a delay pulse generator.

4. Control apparatus for advancing a record member having control information recorded thereon, said apparatus comprising stepping motor means adapted to be coupled to a record member for linearly advancing the record member in preselected increments, the motor including a stator having individually energizable windings and a rotor magnetically coupled to the stator and responsive to the energization of the individual windings for rotating the rotor said preselected increments, sensing means associated with said motor means for sensing the recorded control information on said record member and providing electrical signals corresponding to each sensed piece of control information, binary signal generating means coupled to be responsive to the control signals derived from the record member and providing binary signals in response thereto, binary counting menas coupled to be responsive to the binary signals for providing output signals coupled to individual windings of the motor means in accordance with each count thereof, triggerable circuit means coupled to be responsive to the binary signal generating means for providing an output signal of a preselected time duration related to the time required to incrementally advance the record member from position to position, the output signal from said circuit means being coupled to said binary signal generating means for maintaining it in a preselected state for said preselected time duration, said binary signal generating means including binary signal storage elements coupled to be responsive to the control signal derived from the record member and to said output signal for providing output signals for controlling the rate of said binary signal generating means, and circuit means coupled to be responsive to the latter-mentioned output signals for defining a single control signal representative of the control information recorded on the record member for each incremental advancement of the record member.

5. Control apparatus for advancing a record member having control information recorded thereon, said apparatus comprising stepping motor means adapted to be coupled to a record member for linearly advancing the record member in preselected increments, the motor including a stator having individually energizable windings and a rotor magnetically coupled to the stator and responsive to the energization of the individual windings for rotating the rotor said preselected increments, sensing means associated with said motor means for sensing the recorded control information on said record member and providing electrical signals corresponding to each sensed piece of control information, binary signal generating means coupled to be responsive to the control signals derived from the record member and providing binary signals in response thereto, binary counting means coupled to be responsive to the binary signals for providing output signals coupled to individual windings of the motor means in accordance with each count thereof, triggerable circuit means coupled to be responsive to the binary signal generating means for providing an output signal of a preselected time duration related to the time required to incrementally advance the record member from position to position, the output signal from said circuit means being coupled to said binary signal generating means for maintaining it in a preselected state for said preselected time duration, anti-jitter control means coupled to be responsive to said triggerable circuit means for providing a winding energization signal for reducing the oscillation of the rotor at each increment of advancement for positively advancing the record member, said binary signal generating means including binary signal storage elements coupled to be responsive to the control signal derived from the record member and to said output signal for providing output signals for controlling the rate of said binary signal generating means, and circuit means coupled to be responsive to the latter-mentioned output signals for defining a single control signal representative of the control information recorded on the record member for each incremental advancement of the record member.

6. A method for preventing the generation of erroneous data from a record member having a timing mark recorded thereon with each piece of information due to multiple transitions of the timing mark relative to a sensor resulting in a plurality of timing signals being generated for the same recorded information including the steps of sequentially advancing the record member over a sensor for providing electrical signals corresponding to the information and timing marks recorded thereon, the provision of electrical signals including, detecting the timing mark on the record member including the multiple transitions of the timing mark over the sensor to produce an electrical signal corresponding to the recorded timing data and each transition thereof, and blocking out the signals corresponding to erroneous transitions of the record member over the sensor.

7. A method for preventing the generation of erroneous data from a record member that is advanced in apparatus tending to produce erroneous transitions of the record member, including the steps of providing a stepping motor for incrementally advancing a record member over a sensor, detecting any information recorded on the record member as it is sequentially advanced and providing electrical signals corresponding thereto, electrically blocking out any detected signals produced due to erroneous transitions of the record member, and generating advancing signals for the stepping motor from the information recorded on the record member.

* * * * *